US009053126B2

(12) United States Patent
Yamada

(10) Patent No.: US 9,053,126 B2
(45) Date of Patent: Jun. 9, 2015

(54) INFORMATION PROCESSING APPARATUS, INFORMATION PROCESSING SYSTEM, AND RECORDING MEDIUM

(75) Inventor: Kazuhiro Yamada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 244 days.

(21) Appl. No.: 13/448,704

(22) Filed: Apr. 17, 2012

(65) Prior Publication Data

US 2012/0311189 A1     Dec. 6, 2012

(30) Foreign Application Priority Data

Jun. 1, 2011 (JP) ................................ 2011-123439

(51) Int. Cl.
| G06F 15/16 | (2006.01) |
|---|---|
| G06F 17/30 | (2006.01) |
| G06F 21/62 | (2013.01) |
| H04N 1/00 | (2006.01) |

(52) U.S. Cl.
CPC ........ *G06F 17/3028* (2013.01); *G06F 21/6272* (2013.01); *H04N 1/00217* (2013.01); *H04N 1/00225* (2013.01); *H04N 1/00233* (2013.01); *H04N 1/00244* (2013.01); *H04N 2201/0084* (2013.01); *H04N 2201/0094* (2013.01)

(58) Field of Classification Search
CPC .................................................. H04N 1/00233
USPC .................................................. 709/248, 203
See application file for complete search history.

(56) References Cited

U.S. PATENT DOCUMENTS

| 7,441,049 | B2 * | 10/2008 | Chasman et al. ............. 709/248 |
|---|---|---|---|
| 8,019,900 | B1 * | 9/2011 | Sekar et al. .................. 709/248 |
| 2008/0155079 | A1 * | 6/2008 | Spiegelman .................. 709/223 |
| 2009/0106454 | A1 * | 4/2009 | Girle et al. ................... 709/248 |
| 2009/0279116 | A1 * | 11/2009 | Nishio ........................ 358/1.13 |
| 2010/0023630 | A1 * | 1/2010 | Mendez et al. ............... 709/229 |
| 2010/0299187 | A1 * | 11/2010 | Duggal ....................... 705/14.1 |
| 2010/0309512 | A1 | 12/2010 | Onoda |
| 2011/0019821 | A1 | 1/2011 | Kino |
| 2011/0022505 | A1 | 1/2011 | Kino |
| 2011/0022631 | A1 | 1/2011 | Aikawa et al. |
| 2011/0107402 | A1 * | 5/2011 | Nagata .............................. 726/4 |
| 2011/0295695 | A1 | 12/2011 | Ishihara et al. |

(Continued)

FOREIGN PATENT DOCUMENTS

| JP | 2010-218064 | 9/2010 |
|---|---|---|
| JP | 2010-219698 | 9/2010 |
| JP | 2010-219699 | 9/2010 |
| JP | 2011-18309 | 1/2011 |
| JP | 2011-28056 | 2/2011 |

(Continued)

*Primary Examiner* — Brian J Gillis
*Assistant Examiner* — Steven Lin
(74) *Attorney, Agent, or Firm* — Oblon, McClelland, Maier & Neustadt, L.L.P.

(57) ABSTRACT

A disclosed information processing apparatus is connected to an information management apparatus via a network. The information processing apparatus includes a data storage unit configured to store data that specifies the information management apparatus as an access destination, and a synchronization controller unit configured to periodically compare a list of data stored in the data storage unit and a list of data stored in the information management apparatus, transmit data stored only in the data storage unit to the information management apparatus, and acquire data stored only in the information management apparatus from the information management apparatus and store the acquired data in the data storage unit.

6 Claims, 14 Drawing Sheets

(56) References Cited

U.S. PATENT DOCUMENTS

2011/0296013 A1* 12/2011 Saunders et al. .............. 709/224
2012/0246344 A1* 9/2012 Vargas et al. ................. 709/248

FOREIGN PATENT DOCUMENTS

JP 2011-28575 2/2011
JP 2011-28576 2/2011

* cited by examiner

FIG.6

| DATA ID | UPDATED DATE AND TIME | ACCESS DESTINATION ID INFORMATION |
|---------|----------------------|-----------------------------------|
| DATA A  | OCTOBER 1, 2010 10:00:30 | ...... |
| DATA B  | MAY 5, 2010 20:02:39 | ...... |
| DATA C  | JANUARY 20, 2011 13:30:05 | ...... |
| DATA E  | FEBRUARY 20, 2011 16:24:22 | ...... |

FIG.7

| DATA ID | UPDATED DATE AND TIME | THUMBNAIL IMAGE | STORED DESTINATION PATH NAME | ACCESS DESTINATION ID INFORMATION |
|---|---|---|---|---|
| DATA A | OCTOBER 1, 2010 10:00:30 | IMAGE A | · · · · · | · · · · · |
| DATA B | FEBRUARY 25, 2011 12:02:39 | IMAGE B | · · · · · | · · · · · |
| DATA C | JANUARY 20, 2011 13:30:05 | IMAGE C | · · · · · | · · · · · |
| DATA D | MARCH 1, 2011 15:25:48 | IMAGE D | · · · · · | · · · · · |

| DATA ID | UPDATED DATE AND TIME | THUMBNAIL IMAGE | STORED DESTINATION PATH NAME | ACCESS DESTINATION ID INFORMATION |
|---|---|---|---|---|
| DATA A | OCTOBER 1, 2010 10:00:30 | IMAGE A | . . . . . | . . . . . |
| DATA B | FEBRUARY 25, 2011 12:02:39 | IMAGE B | . . . . . | . . . . . |
| DATA C | JANUARY 20, 2011 13:30:05 | IMAGE C | . . . . . | . . . . . |
| DATA D | MARCH 1, 2011 15:25:48 | IMAGE D | . . . . . | . . . . . |
| DATA E | FEBRUARY 20, 2011 16:24:22 | IMAGE E | | |

FIG.10

| ACCESS DESTINATION ID INFORMATION | API NAME | LIST-OF-DATA INFORMATION ACQUIRING IF INFORMATION | DATA ACQUIRING IF INFORMATION | DATA TRANSMITTING IF INFORMATION | 118 |
|---|---|---|---|---|---|
| File:// cloud-a | cloud-a access API | .... | .... | .... | |
| File:// cloud-b | cloud-b access API | .... | .... | .... | |
| ¥¥IP address¥shared folder name | standard API | | | | |

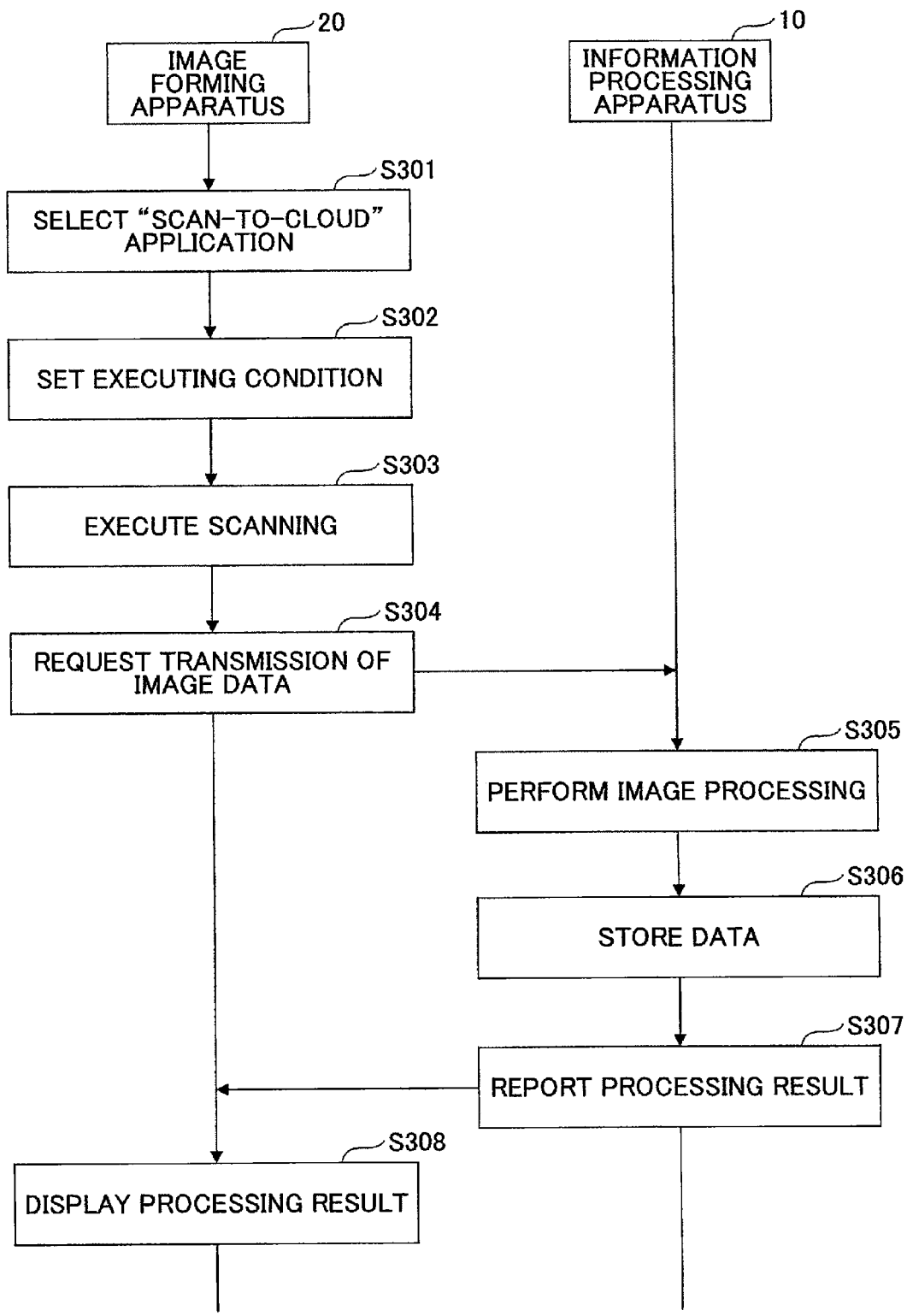

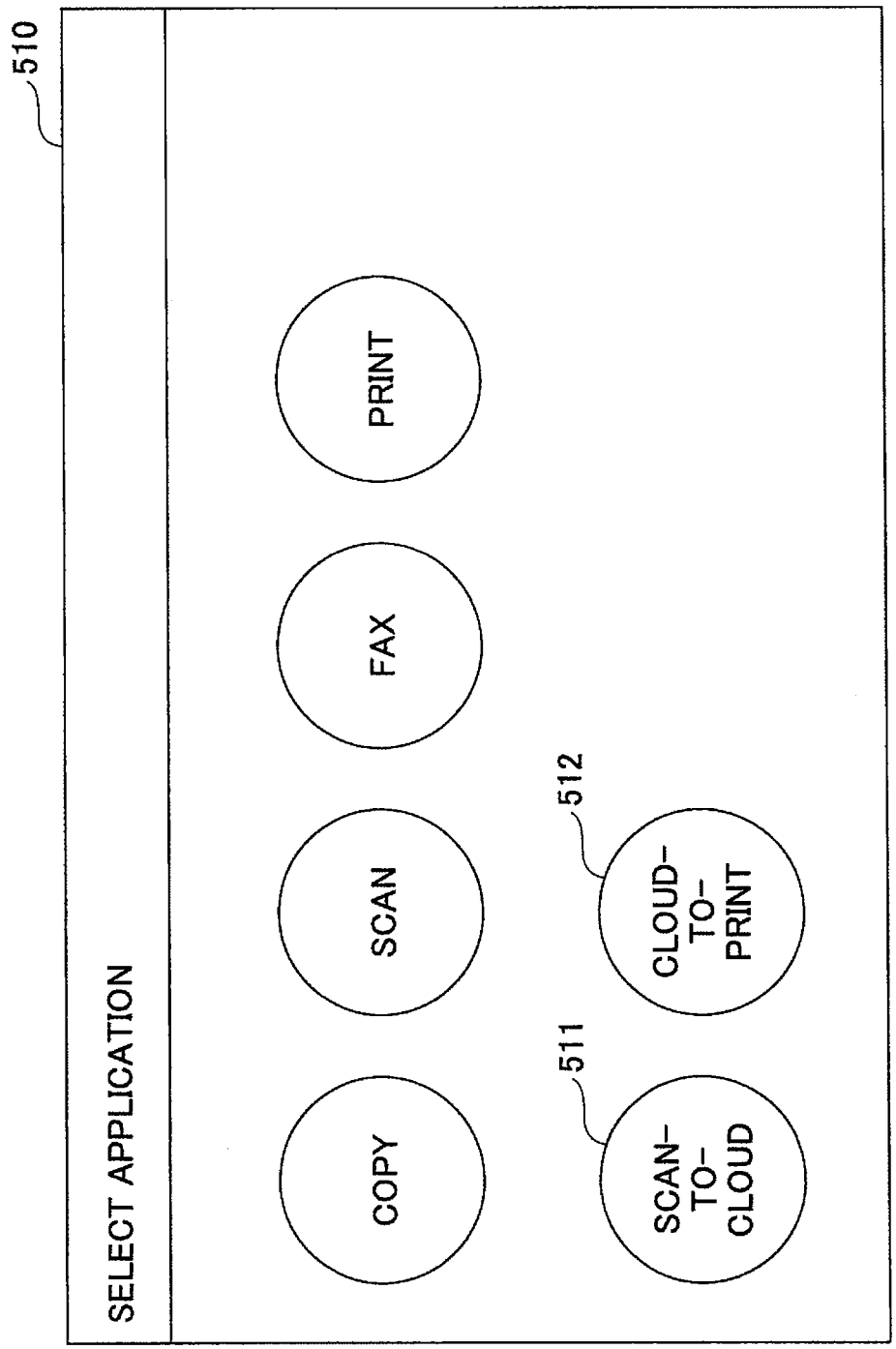

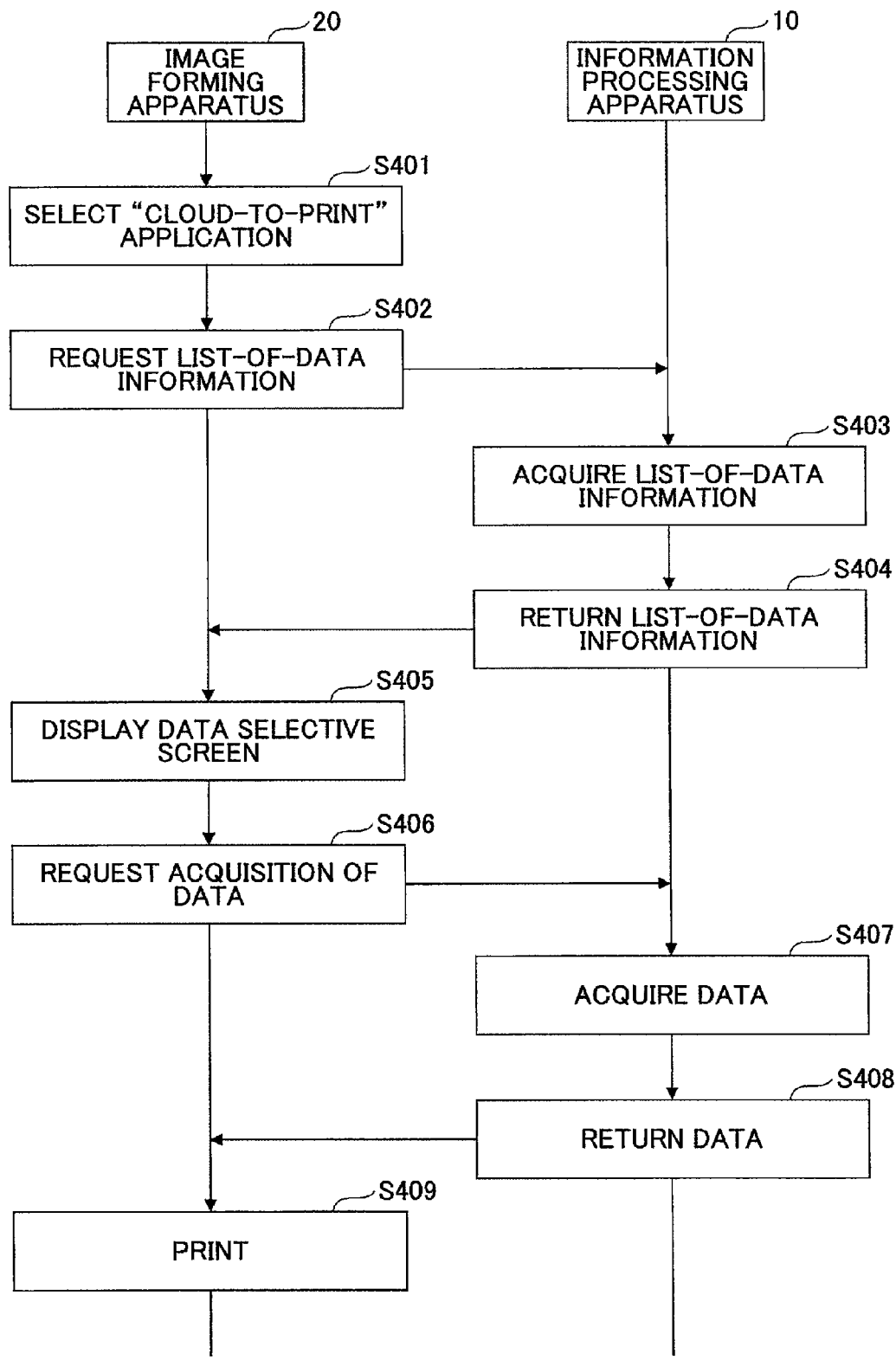

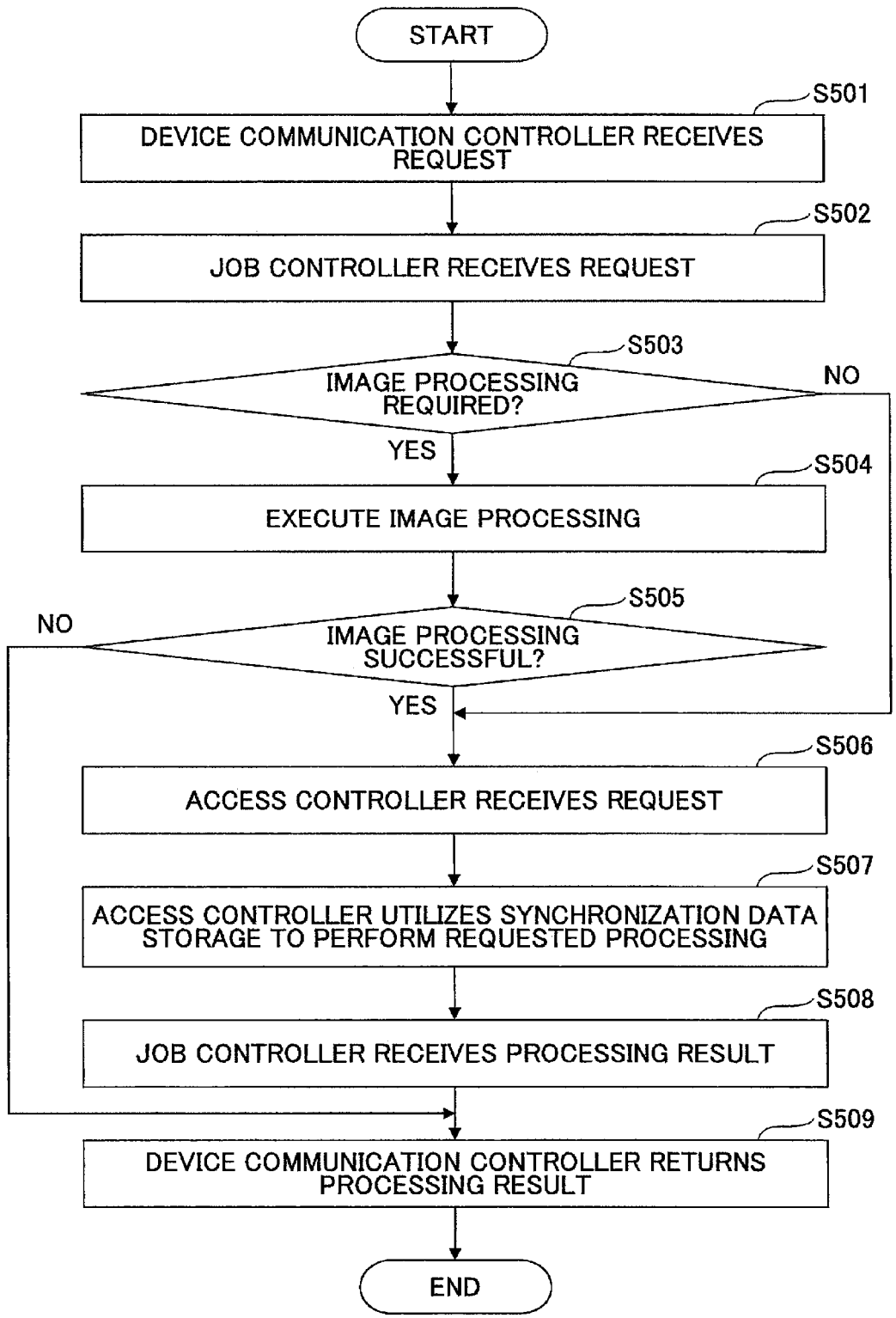

INFORMATION PROCESSING APPARATUS, INFORMATION PROCESSING SYSTEM, AND RECORDING MEDIUM

BACKGROUND OF THE INVENTION

1. Field of the Invention

The disclosures discussed herein generally relate to an information processing apparatus, an information processing system, and a computer-readable recording medium, and specifically relate to an information processing apparatus, an information processing system, and a computer-readable recording medium storing a program that utilize services provided via a wide area network.

2. Description of the Related Art

Various services have increasingly been made available to users via the Internet utilizing cloud computing, and these services are so-called "cloud-based service(s)". In the cloud-based services that handle data, a user may dispose data over the cloud-based service and access the data from anywhere the user desires via his or her PC 40 or via various other information processing terminals. For example, the user may be able to access the data that have been uploaded from his or her PC 40 inside the office to the cloud-based service, and then perform tasks on the uploaded data via the PC 40 at home or at a business trip destination. That is, the use of the cloud-based services may mitigate the limitations to data accessibility, and hence, the user may access the data via the PC or the like from anywhere the user desires. This kind of relaxed accessibility may be called "location free".

On the other hand, some companies indefinitely limit data accessibility to a wide area network such as the Internet, because of security concerns. In such companies, it may be difficult to upload data to the cloud-based services from the terminals inside the office. When the users are not allowed to upload data to the cloud-based services from their terminals inside the office, the users may not receive an advantageous effect of the "location free" accessibility to the data. That is, the users may not be allowed to have access to the data at home or at a business trip destination. In the mean time, ensuring the network security within the company may be indispensable in view of recent dramatic increases in unauthorized access and computer viruses.

RELATED ART DOCUMENT

Patent Document

Patent Document 1: Japanese Laid-open Patent Publication No. 2010-218064

SUMMARY OF THE INVENTION

Accordingly, it is a general object of at least one embodiment of the present invention to provide an information processing apparatus, an information processing system, and a computer-readable recording medium storing a program, which are capable of providing location free advantages while ensuring an appropriate security level as well as substantially eliminating one or more problems caused by the limitations and disadvantages of the related art.

According to an embodiment, there is provided an information processing apparatus connected to an information management apparatus via a network. The information processing apparatus includes a data storage unit configured to store data that specifies the information management apparatus as an access destination; and a synchronization controller unit configured to periodically compare a list of data stored in the data storage unit and a list of data stored in the information management apparatus, transmit data stored only in the data storage unit to the information management apparatus, and acquire data stored only in the information management apparatus from the information management apparatus and store the acquired data in the data storage unit.

According to another embodiment, there is provided an image processing system including an information processing apparatus and an apparatus connected to a first network. In the image processing system, the information processing apparatus includes a data storage unit configured to store data input from the apparatus or data to be output to the apparatus, the data specifying an information management apparatus connected to a second network as an access destination; and a synchronization controller unit configured to periodically compare a list of data stored in the data storage unit and a list of data stored in the information management apparatus, transmit data stored only in the data storage unit to the information management apparatus, and acquire data stored only in the information management apparatus from the information management apparatus and store the acquired data in the data storage unit.

According to still another embodiment, there is provided a non-transitory computer-readable recording medium storing a program, which causes, when processed by a processor, a computer connected to an information management apparatus via a network to execute a procedure, which includes storing data that specifies the information management apparatus as an access destination in a data storage unit; and periodically comparing a list of data stored in the data storage unit and a list of data stored in the information management apparatus, transmitting data stored only in the data storage unit to the information management apparatus, and acquiring data stored only in the information management apparatus from the information management apparatus and storing the acquired data in the data storage unit.

Additional objects and advantages of the embodiments will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

BRIEF DESCRIPTION OF THE DRAWINGS

Other objects and further features of embodiments will be apparent from the following detailed description when read in conjunction with the accompanying drawings, in which:

FIG. 6 is a diagram illustrating an example of list-of-data information acquired from a cloud-based service;

FIG. 7 is a diagram illustrating a configuration example of synchronization data storage;

FIG. 8 is a diagram illustrating a configuration example of updated synchronization data storage;

FIG. 10 is a diagram illustrating a configuration example of an API selective information storage;

FIG. 11 is a diagram illustrating an example of a scan-to-cloud application executing procedure;

FIG. 12 is a diagram illustrating an example of an application selective screen;

FIG. 13 is a diagram illustrating an example of a cloud-to-print application executing procedure; and FIG. 14 is a flowchart illustrating an example of a procedure executed by the information processing apparatus in response to a request from the image forming apparatus.

DESCRIPTION OF THE PREFERRED EMBODIMENTS

Figure 1:
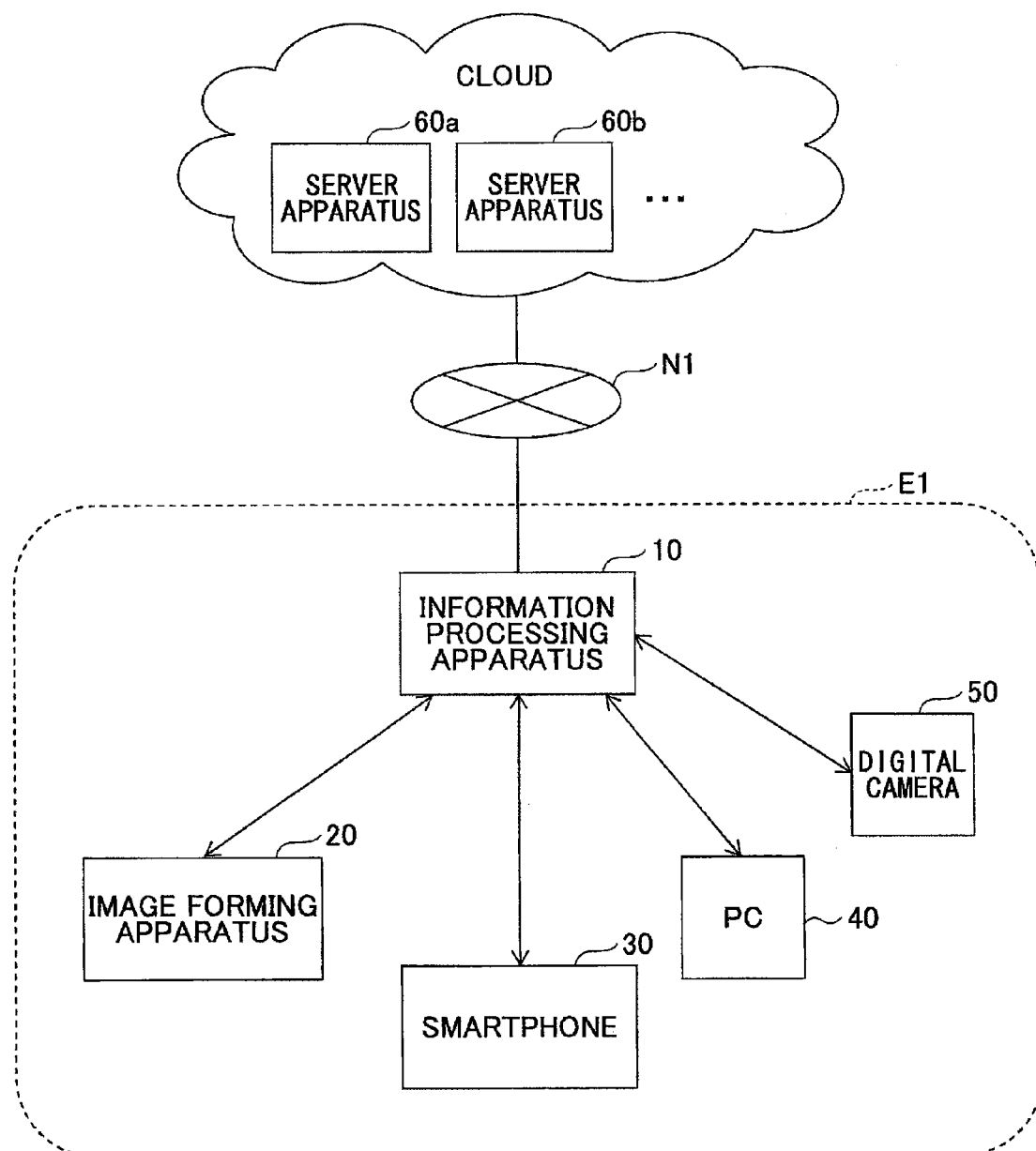
FIG. 1 is a diagram illustrating a system configuration example according to an embodiment.

Preferred embodiments are described below with reference to the accompanying drawings. FIG. 1 is a diagram illustrating a system configuration example according to an embodiment.

In FIG. 1, an information processing apparatus 10 and various other apparatuses such as an image forming apparatus 20, a smartphone 30, a personal computer (PC) 40, and a digital camera 50 may be communicable via a local area network (LAN) or a network such as an intranet (regardless of wired or wireless) within a corporate internal network environment E1. The corporate internal network environment E1 is a network environment constructed inside a company, and access to an external network N1 such as the Internet is limited in the corporate internal network environment E1.

The information processing apparatus 10 may be capable of communicating with various server apparatuses 60 (e.g., server apparatuses 60a, 60b, etc.) via the external network N1. Specifically, as illustrated in FIG. 1, only the information processing apparatus 10 is allowed to have access to the external network N1. In this embodiment, the information processing apparatus 10 is configured to ensure the "location free" advantages (advantageous accessibility to resources without users' locational limitation) simultaneously with ensuring the security of the corporate internal network environment E1. The information processing apparatus 10 may be a special-purpose apparatus, or a general-purpose apparatus such as a personal computer (PC).

The image forming apparatus 20, the smartphone 30, the PC 40, the digital camera 50 and the like are examples of apparatuses that request the information processing apparatus 10 to execute jobs such as transmission of data to the server apparatuses 60 or acquisition of data from the server apparatuses 60. Hence, apparatuses other than those described above may also be configured to be communicable with the information processing apparatus 10. Note that in this embodiment, the image forming apparatus 20 is configured to request the information processing apparatus 10 to execute such jobs.

Each of the server apparatuses 60 is a computer that provides a cloud-based service via the external network N1. In this embodiment, each of the server apparatuses 60 is configured to provide a data management service. Specifically, the server apparatus 60 is configured to store uploaded data and return the stored data in response to a data download request.

Figure 2:
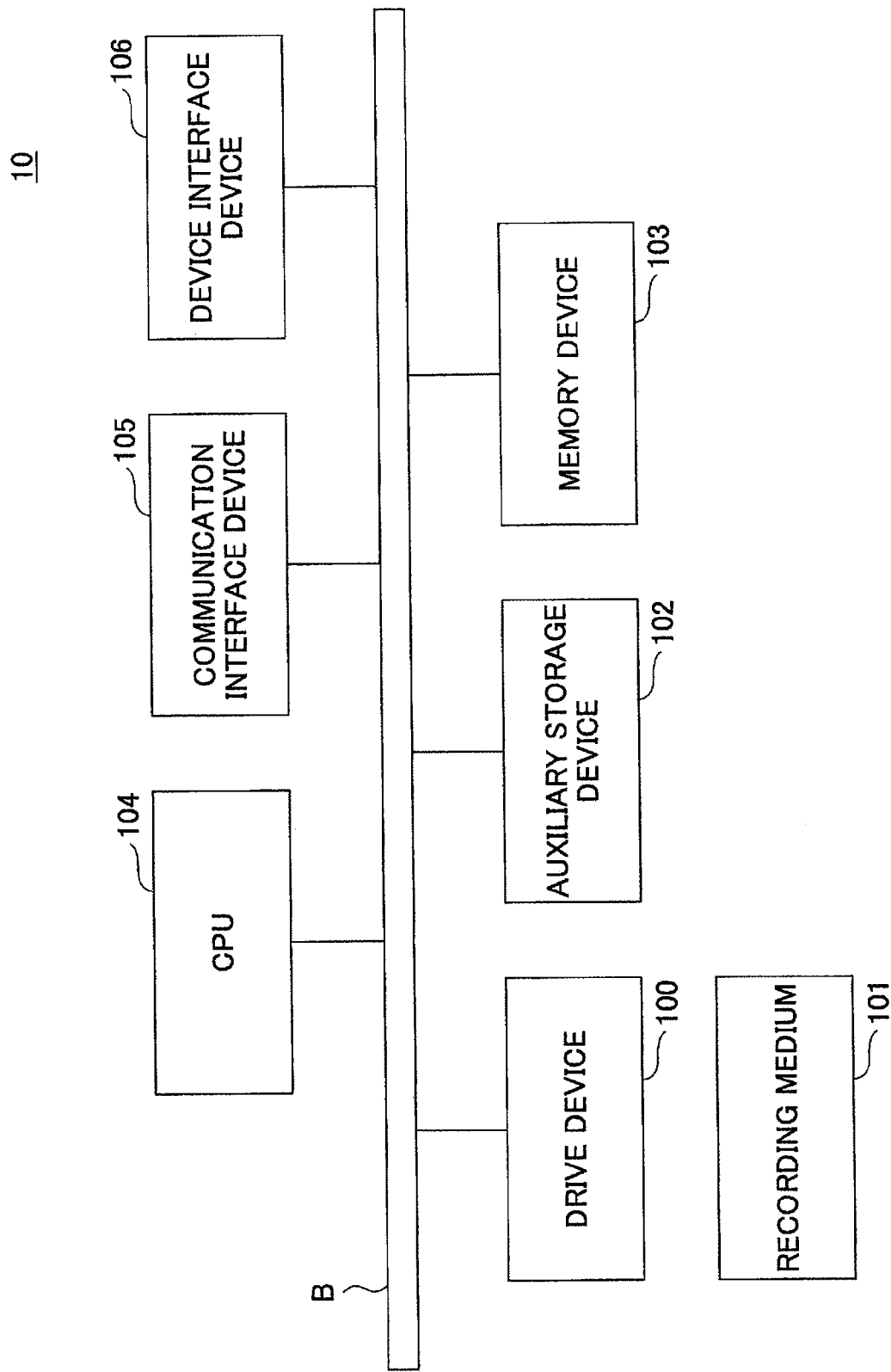
FIG. 2 is a diagram illustrating a hardware configuration example of an information processing apparatus according to an embodiment.

FIG. 2 is a diagram illustrating a hardware configuration example of the information processing apparatus 10 according to the embodiment. The information processing apparatus 10 illustrated in FIG. 2 includes a drive device 100, an auxiliary storage device 102, a memory device 103, a CPU 104, a communication interface device 105 and a device interface device 106, which are mutually connected via a bus B.

A computer program (hereinafter simply called a "program") that implements various processes or procedures performed by the information processing apparatus 10 is provided with a non-transitory computer-readable recording medium 101 such as a CD-ROM. When the recording medium 101 storing the program is set in the drive device 100, the program is installed from the recording medium 101 into the auxiliary storage device 102 via the drive device 100. Note that the program may not necessarily be installed from the recording medium 101, but may be installed by downloading it from other computers via the network. The auxiliary storage device 102 stores desired data and the like while storing the installed program.

The memory device 103 retrieves, on receiving an instruction to activate the program, the program from the auxiliary storage device 102 and subsequently loads the retrieved program. The CPU 104 executes functions associated with the information processing apparatus 10 based on the program loaded on the memory device 103. The communication interface device 105 is hardware such as a network card for connecting the information processing apparatus 10 to the external network N1. The device interface device 106 is hardware such as a network card and a universal serial bus (USB) connector for allowing the information processing apparatus 10 to communicate with other apparatuses, such as the image forming apparatus 20, the smartphone 30, the PC 40, and the digital camera 50 within the corporate network E1.

Figure 3:
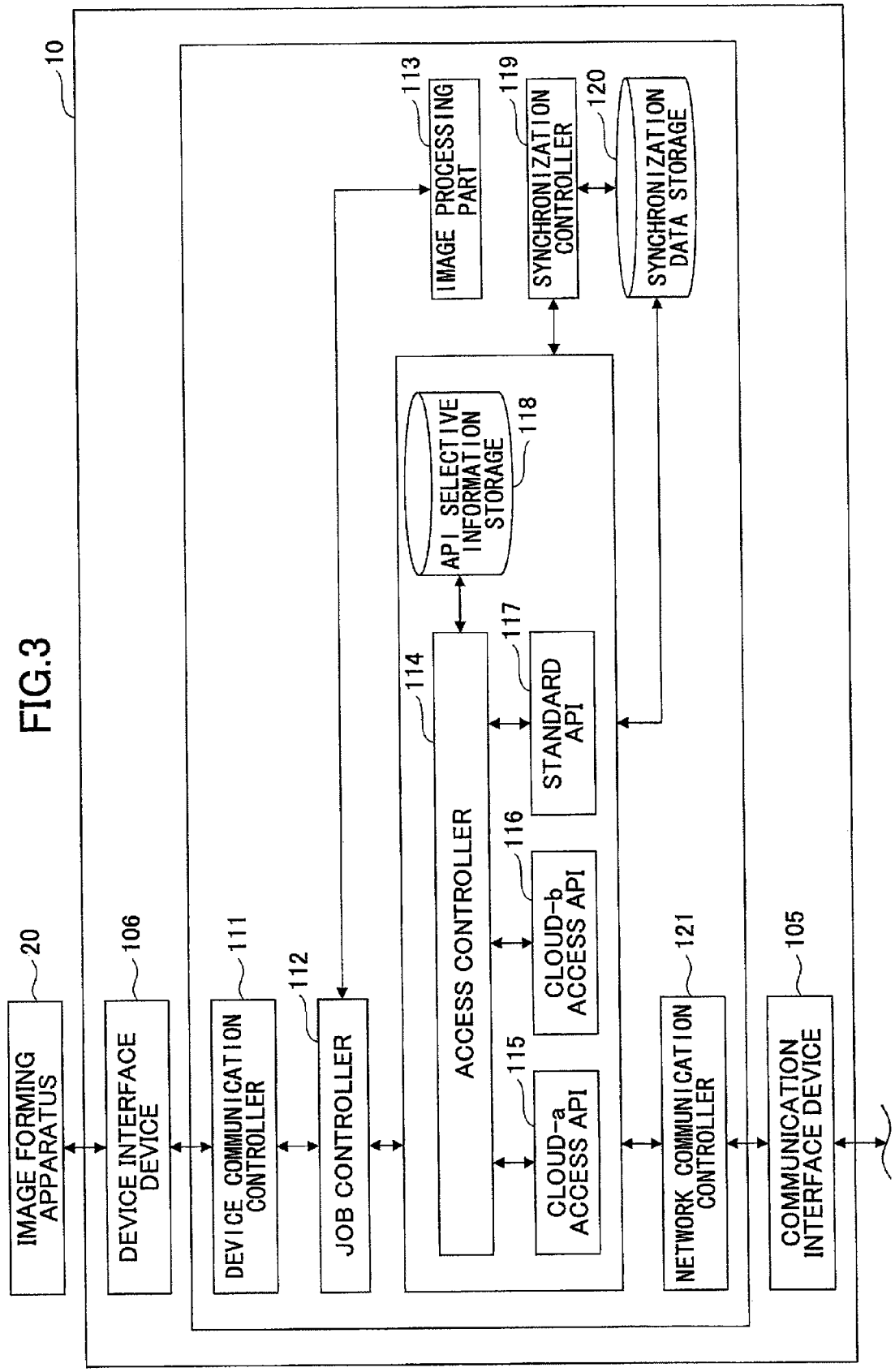
FIG. 3 is a diagram illustrating a functional configuration example of the information processing apparatus according to an embodiment.

FIG. 3 is a diagram illustrating a functional configuration example of the information processing apparatus 10 according to the embodiment. In FIG. 3, the information processing apparatus 10 includes a device communication controller 111, a job controller 112, a image processing part 113, an access controller 114, a cloud-a access API 115, a cloud-b access API 116, a standard API 117, an API selective information storage 118, a synchronization controller 119, a synchronization data storage 120 and a network communication controller 121. Functions of these components are implemented by causing the CPU 104 to execute the program installed in the information processing apparatus 10. Note that a function of the synchronization data storage 120 may be implemented by utilizing the auxiliary storage device 102.

The device communication controller 111 is configured to control communications between the information processing apparatus 10 and other apparatuses via the device interface device 106. The network communication controller 121 is configured to control communications between the information processing apparatus 10 and the server apparatuses 60 via the communication interface device 105. The network communication controller 112 may preferably be configured to monitor unauthorized access and computer viruses from the external network N1 in order to ensure a secure network communication.

The job controller 112 is configured to control execution of jobs requested by apparatuses such as the image forming apparatus 20. For example, assume that data are transmitted to the server apparatus 60 after image processing is being performed. In this case, the job controller 112 requests the image processing part 113 to perform image processing and subsequently requests the access controller 114 to transmit the image processed data. The image processing part 113 is configured to execute various types of image processing.

The access controller 114 is configured to optionally or selectively utilize an application program interface (API) provided by each of the server apparatuses 60 (i.e., each of the cloud-based services) so as to execute the access to the corresponding server apparatus 60 (i.e., the cloud-based service). Specifically, some cloud-based services may require installation of a specific API at a client side in order to have access to the corresponding cloud-based service. The access controller 114 is configured to determine a specific API corresponding to the destination server apparatus 60 (i.e., the cloud server) to have access to the server apparatus 60 via the determined specific API.

The cloud-a access API 115 and the cloud-b access API 116 are examples of such specific APIs. Specifically, the cloud-a access API 115 is a program module including a communication process related API based on an access mode of the cloud-based service provided by the server apparatus 60a and implementation of such a communication process. The cloud-b access API 116 is a program module including a communication process related API based on an access mode of the cloud-based service provided by the server apparatus 60b and implementation of such a communication process.

The standard API 117 is a program module including an API associated with a communication protocol corresponding to a standard operating system (OS) of the information processing apparatus 10 such as a server message block (SMB), and/or a web-based distributed authoring and versioning (WebDAV). The standard API 117 is utilized for accessing the cloud-based services that are accessible via the standard communication protocol.

The API selective information storage 118 is configured to store associated information on the cloud-based services (the server apparatuses 60) and the corresponding APIs. Specifically, the API selective information storage 118 is configured to store an API utilized for each of the cloud-based services (each of the server apparatuses 60). Hence, the access controller 114 determines which of the cloud-a access API 115, the cloud-b access API 116, and the standard API 117 is appropriate to be utilized by referring to the API selective information storage 118.

The synchronization controller 119 is configured to periodically (in a predetermined cycle) synchronize a data group stored by the server apparatus 60 and a data group stored by the information processing apparatus 10. The synchronization controller 119 is configured to transfer a data group stored by one of the server apparatus 60 and the information processing apparatus 10 to the other. As a result, a stored content of the server apparatus 60 will match that of the information processing apparatus 10.

Figure 4:
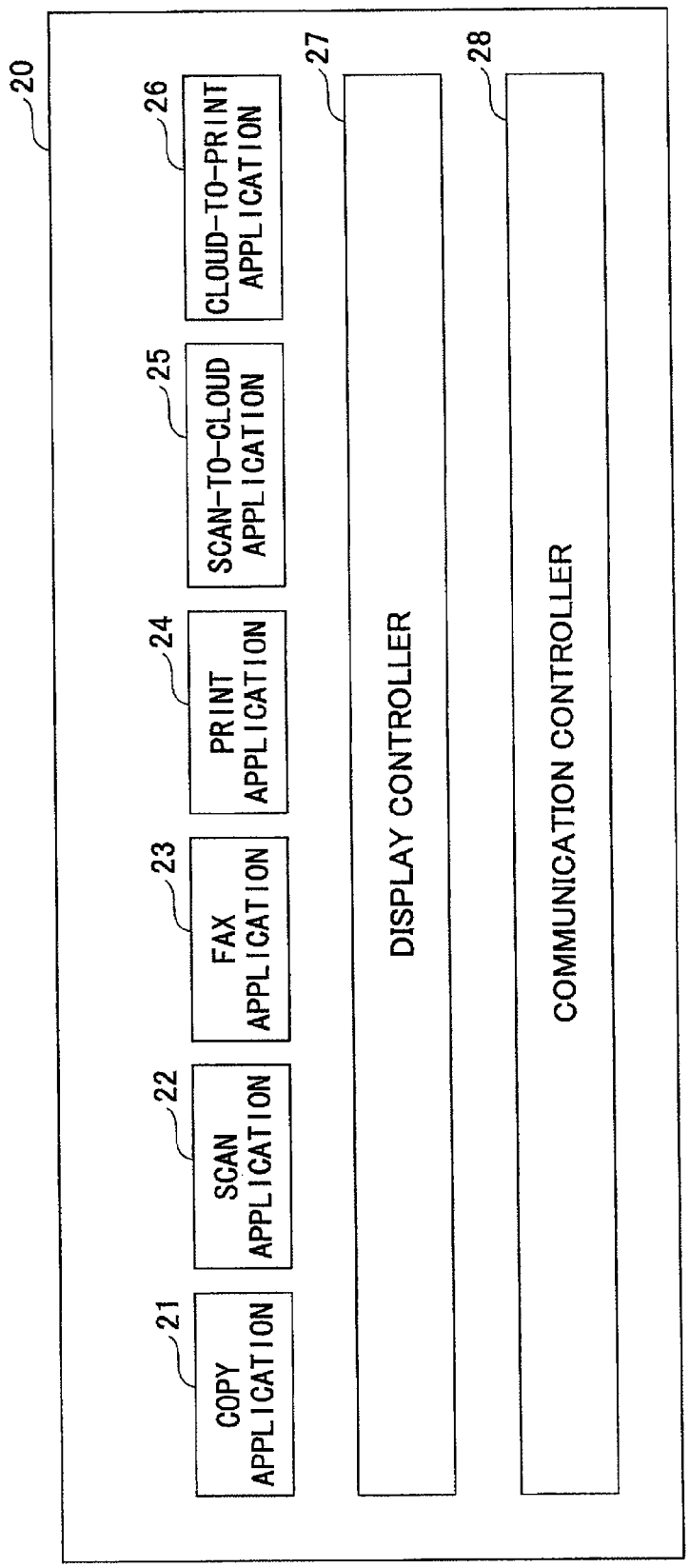
FIG. 4 is a diagram illustrating a functional configuration example of an image forming apparatus according to an embodiment.

FIG. 4 is a diagram illustrating a functional configuration example of the image forming apparatus 20 according to the embodiment. In FIG. 4, the image forming apparatus 20 includes a copy application 21, a scan application 22, a fax application 23, a print application 24, a scan-to-cloud application 25, a cloud-to-print application 26, a display controller 27 and a communication controller 28.

The copy application 21 is an application program configured to cause the image forming apparatus 20 to execute a copy job. The scan application 22 is an application program configured to cause the image forming apparatus 20 to execute a scan job. The fax application 23 is an application program configured to cause the image forming apparatus 20 to execute a fax transmitting job or a fax receiving job. The print application 24 is an application program configured to cause the image forming apparatus 20 to execute a print job.

The scan-to-cloud application 25 is an application program configured to cause the image forming apparatus 20 to scan image data from a paper document and transmit (upload) the scanned image data to the server apparatus 60. Note that the scan-to-cloud application 25 delegates the uploading of the image data to the server apparatus 60 to the information processing apparatus 10. This is because the image forming apparatus is not allowed to have direct communication with the server apparatus 60.

The cloud-to-print application 26 is an application program configured to cause the image forming apparatus 20 to download image data from the server apparatus 60 and execute a print job associated with the downloaded image data. Note that the scan-to-cloud application 25 delegates the downloading of the image data from the server apparatus 60 to the information processing apparatus 10.

The display controller 27 is configured to display various screens on an operations panel of the image forming apparatus 20. The communication controller 28 is configured to control communications with the information processing apparatus 10.

Note that in this embodiment, a multifunctional peripheral having an imaging device (scanner) and a printing device (printer) is employed as the image forming apparatus 20. Alternatively, an apparatus having any one of printer, scanner, copier and facsimile functions may also be utilized as the image forming apparatus 20.

Figure 5:
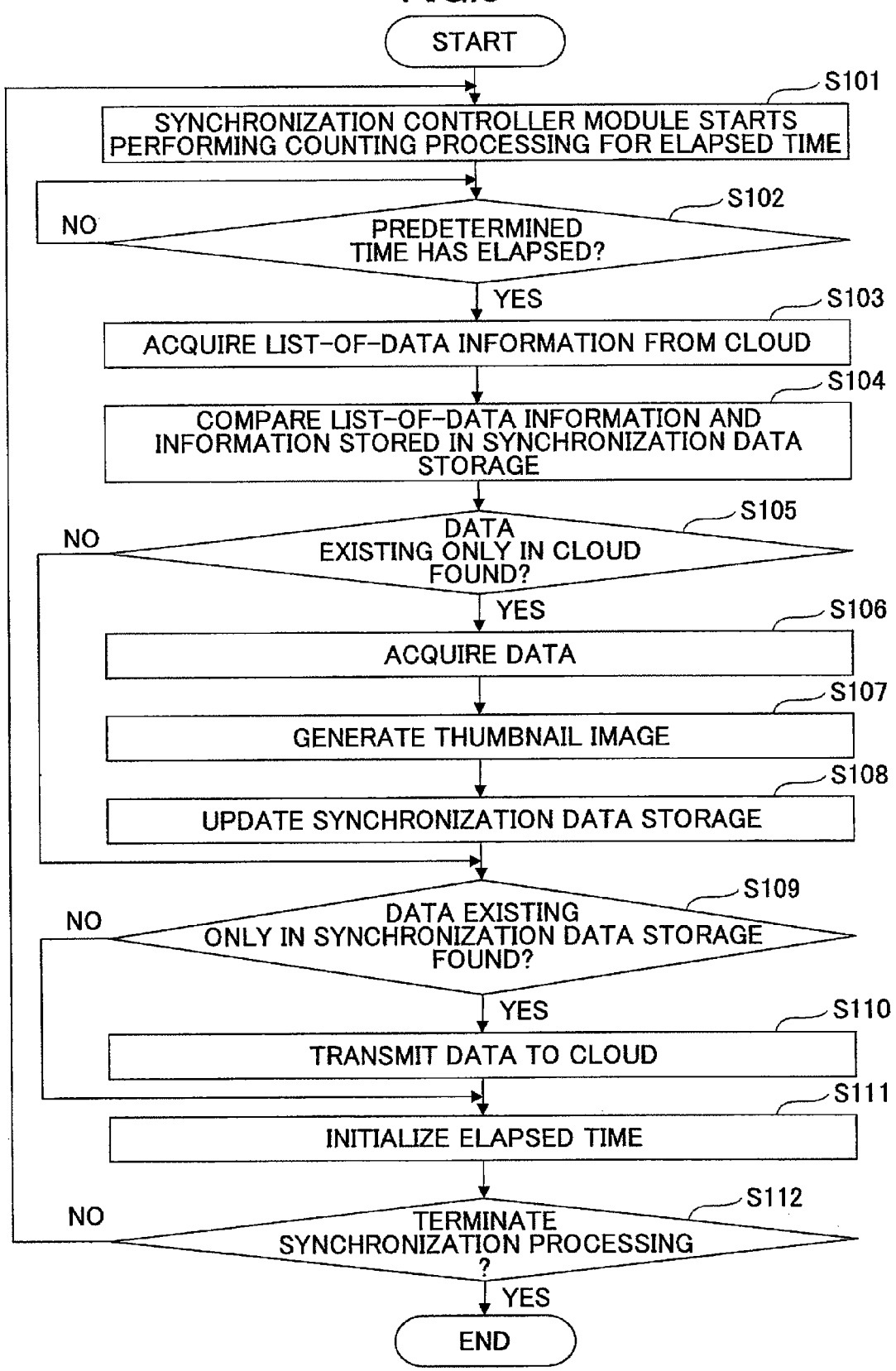
FIG. 5 is a flowchart illustrating a data synchronization procedure.

Next, a procedure executed by the information processing apparatus 10 is described below. FIG. 5 is a flowchart illustrating a data synchronization procedure.

After the startup of the information processing apparatus 10, the synchronization controller 119 starts counting an elapsed time (step S101) and waits until a predetermined time (e.g., 1 hour, 6 hours, 12 hours or 24 hours) has elapsed ("No" in step S102). Note that the predetermined time may be set in advance as a value indicating a period or cycle for performing synchronization processing and may be stored in the auxiliary storage device 102.

When the predetermined time has elapsed ("Yes" in step S102), the synchronization controller 119 acquires list-of-data information stored in each of the server apparatuses 60 (each of the cloud-based services) via the access controller 114 from the corresponding server apparatus 60 (step S103).

FIG. 6 is a diagram illustrating an example of the list-of-data information acquired from the cloud-based service (i.e., server apparatus 60). In FIG. 6, the list-of-data information includes a data ID and updated date and time for each of the updated data. The data ID is identifier information of the data. The updated date and time are date and time at which the data are updated. Hence, in step S103, bibliographic information of each data is acquired; however, an entity of the data is not acquired. However, the entity of the data may be acquired. Note that the server apparatus 60 indicates one or more server apparatuses 60 set in advance as an access destination. For example, the auxiliary storage device 102 is configured to store an IP address of each of the server apparatuses 60 set as an access destination or a uniform resource locator (URL) and the like (hereinafter called "access destination identifier (ID) information") corresponding to the cloud-based service provided by the server apparatus 60.

Note that the list-of-data information illustrated in FIG. 6 includes access destination ID information for each of data A to E. The access destination ID information in the list-of-data information indicates the access destination ID information of the server apparatus 60 (i.e., the cloud-based service) from which the bibliographic information of the data is acquired. The access destination ID information of the server apparatus 60 is provided for the list-of-data information by the synchronization controller 119.

Subsequently, the synchronization controller 119 compares the acquired list-of-data information and the list-of-data information stored in the synchronization data storage 120 (step S104), and determines (checks) whether there are any data existing only in the cloud-based service (step S105).

FIG. 7 is a diagram illustrating a configuration example of the synchronization data storage 120. The synchronization data storage 120 is configured to store a data ID, updated date and time, a thumbnail image, a stored destination path name and access destination ID information for each of the data stored in the auxiliary storage 102. The data ID is identifier information of the data. The updated date and time are date and time at which the data are updated. The thumbnail image is a thumbnail image of the data. The stored destination path name is a path name indicating a stored position of the data in the auxiliary storage device 102. The access destination ID information is access destination identification information of the server apparatus 60 (i.e., the cloud-based service) serving as a data acquisition destination or data transmission destination.

In step S104, sets of data having the data ID, the updated date and time, and the access destination ID information are compared. In step S105, it is determined whether there is any one of data having the data ID, the updated date and time and the access destination ID information that are contained in the list-of-data information illustrated in FIG. 6 but are not contained in the synchronization data storage 120 illustrated in FIG. 7. Referring to the examples of data tables illustrated in FIGS. 6 and 7, data E (FIG. 6) correspond to such data that are contained in the list-of-data information illustrated in FIG. 6 but are not contained in the synchronization data storage 120 (FIG. 7).

When there are the above data that are not contained in the synchronization data storage 120 ("Yes" in step S105), the synchronization controller 119 acquires the corresponding data via the access controller 114 from the cloud-based service (i.e., the server apparatus 60) specified by the access destination ID information relating to the corresponding data, and stores the acquired data in the auxiliary storage device 102 (step S106). Subsequently, the synchronization controller 119 generates a thumbnail image of the acquired data (step S107). The synchronization controller 119 subsequently adds to the synchronization data storage 120 the data ID, the update date and time associated with the acquired data, the generated thumbnail image, the stored destination path name of the corresponding data and access destination ID information of the cloud-based service from which the corresponding data are acquired (step S108).

FIG. 8 is a diagram illustrating an example of updated synchronization data storage 120. Specifically, FIG. 8 illustrates a content of the synchronization data storage 120 after steps S107 and S108 are executed. As illustrated in FIG. 8, a record associated with the data E is added to the synchronization data storage 120.

Subsequently, the synchronization controller 119 determines whether there are any data only existing in the synchronization data storage 120 (step S109). When there are such corresponding data that exist only in the synchronization data storage 120 ("Yes" in step S109), the synchronization controller 119 transmits (uploads) the corresponding data via the access controller 114 from the cloud-based service (i.e., the server apparatus 60) specified by the access destination ID information relating to the corresponding data (step S110). Referring to the examples of data in FIGS. 6 and 7, such data that exist only in the synchronization data storage 120 correspond to data D, and the data D are transmitted to the cloud-based service in association with the access destination ID information of the data D in FIG. 7. The cloud-based service that has received the corresponding file stores the received file.

Subsequently, the synchronization controller 119 initializes the elapsed time (step S111). The synchronization controller 119 subsequently determines whether to terminate the synchronization processing (step S112). When the synchronization processing is not terminated ("No" in step S112), the synchronization controller 119 repeatedly carries out processing subsequent to step S101. Hence, the synchronization processing illustrated in FIG. 5 is periodically executed (in a predetermined cycle).

Subsequently, processing executed by the access controller 114 or the like when the synchronization controller 119 accesses the cloud-based service in step S103, S106 or S110 is described.

Figure 9:
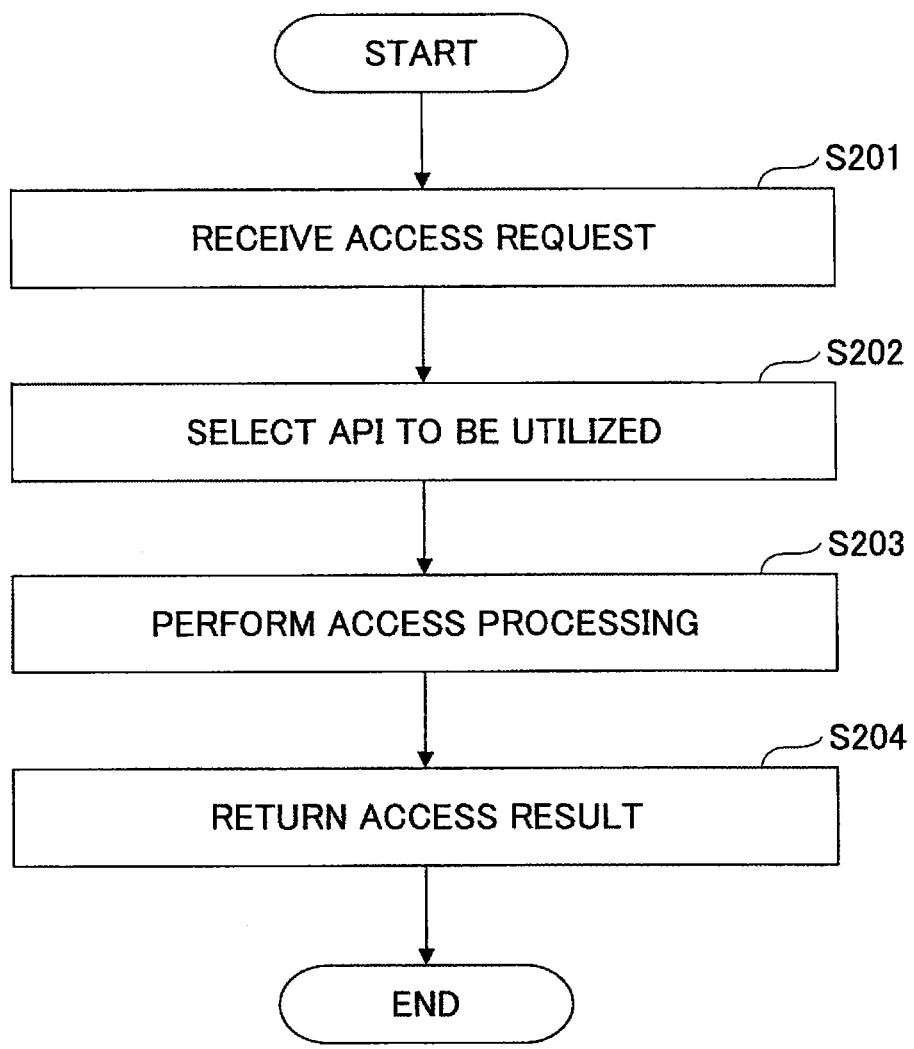
FIG. 9 is a flowchart illustrating an example of an access procedure for accessing the cloud-based service.

FIG. 9 is a flowchart illustrating an example of an access procedure for accessing the cloud-based service.

In step S201, the access controller 114 receives an access request from the synchronization controller 119 (step S201). When the access request is a request for acquiring list-of-data information, the access request includes access destination ID information of acquisition destination from which the list-of-data are acquired. When the access request is a request for acquiring data, the access request includes a data ID of the data to be acquired, and access destination ID information of the cloud-based service from which the data are acquired. When the access request is a request for transmitting data, the access request includes the data to be transmitted, and access destination ID information of transmission destination of the cloud-based service to which the data are transmitted.

Subsequently, the access controller 114 selects an API utilized for accessing the cloud-based service (e.b., acquiring the list-of-data information and data, or transmitting the data) based on the access destination ID information and an API selective information storage 118 (step S202).

FIG. 10 is a diagram illustrating a configuration example of an API selective information storage 118. As illustrated in FIG. 10, the API selective information storage 118 stores an API name, list-of-data information acquiring IF information, data acquiring IF information and data transmitting IF information for each of the access destination ID information.

The API name is a name of an API corresponding to the cloud-based service in association with the access destination ID information. The list-of-data information acquiring IF information is interface information (function identifier, argument) of a function for acquiring list-of-data information in an API in association with the API name. The data acquiring IF information is interface information of a function for acquiring data in an API in association with the API name. The data transmitting IF information is interface information of a function for transmitting data in an API in association with the API name.

Note that when there is an access configuration (communication configuration) excluding the respective access configurations of the list-of-data acquisition, data acquisition, and data transmission, and interface information corresponding to the access configuration may further be stored in association with each of APIs.

In step S202 described above, the access controller 114 selects the API (one of the cloud-a access API, cloud-b access API and standard API in this embodiment) in association with the API name corresponding to the access destination ID information specified by the access request as an API to be utilized (hereinafter called an "utilized API"). In collaborating plural cloud-based services, extensibility and flexibility of the cloud-based services may be improved by automatic selection of the utilized API. Specifically, when a new cloud-based service is a collaboration destination (access destination), the API corresponding to such a cloud-based service may be installed in the information processing apparatus 10, and information associated with such an API may be registered with the API selective information storage 118.

Subsequently, the access controller 114 executes access processing (communication process) in response to the access request (step S203). When the access request is a request for acquiring list-of-data information, the access controller 114 retrieves a function of a utilized API based on the list-of-data acquiring IF information stored in association with the utilized API in the API selective information storage 118. The utilized API acquires, in response to the retrieved function, the list-of-data information from the access destination cloud-based service, and subsequently returns the acquired list-of-data information to the access controller 114.

When the access request is a request for acquiring data, the access controller 114 retrieves a function of a utilized API based on the data acquiring IF information stored in association with the utilized API in the API selective information storage 118. The utilized API acquires, in response to the retrieved function, the data specified by the access request from the access destination cloud-based service, and returns the acquired data to the access controller 114.

When the access request is a request for transmitting data, the access controller 114 retrieves a function of a utilized API based on the data transmitting IF information stored in association with the utilized API in the API selective information storage 118. The utilized API transmits, in response to the retrieved function, data specified by the access request to the access destination cloud-based service, and returns a transmission result (i.e., information indicating successful transmission or transmission failure) to the access controller 114. Note that the utilized API may convert a data format of the data subject to transmission into a data format adequate for the cloud-based service.

Note that the connection of the cloud-based service may be established or may be terminated every time step S203 is executed in order to provide a more effective security. Specifically, it is assumed that functions associated with starting to establish the connection and ending (terminating) the established connection are contained for each of the APIs (each of the cloud-a access API, cloud-b access API and standard API in this embodiment). In such a case, in step S203, a function for starting to establish the connection in the utilized API may be initially retrieved, a function corresponding to the access request in the utilized API may be subsequently retrieved and a function for ending or terminating the established connection in the utilized API may be subsequently retrieved. Accordingly, in the information processing apparatus 10, a communication port (e.g., TCP port) via the external network N1 may limit an effective period of the communication for synchronizing the cloud-based service. As a result, the possibility for the information processing apparatus 10 to face a threat such as unauthorized access or virus may be reduced.

Subsequently, the access controller 114 returns an access result to the synchronization controller 119 (step S204). When the access request is a request for acquiring list-of-data information, the list-of-data information is returned to the synchronization controller 119. When the access request is a request for acquiring data, the acquired data is returned to the synchronization controller 119. When the access request is a request for transmitting data, a data transmission result is returned to the synchronization controller 119.

Note that in step S103 of FIG. 5, the synchronization controller 119 requests the access controller 114 to acquire the list-of-data information for each of the cloud-based services set in advance as the access destinations. Accordingly, the procedure illustrated in FIG. 9 is executed for each of the access destinations. Further, in step S106, the synchronization controller 119 requests the access controller 114 to acquire the data for each of the cloud-based services serving as the data acquisition destinations. Accordingly, the procedure illustrated in FIG. 9 is executed for each of the data acquisition destinations. In addition, in step S110, the synchronization controller 119 requests the access controller 114 to transmit the data for each of the cloud-based services serving as the data transmission destinations. Accordingly, the procedure illustrated in FIG. 9 is executed for each of the data transmission destinations.

Next, a procedure of executing a scan-to-cloud application 25 is described. FIG. 11 is a diagram illustrating an example of the scan-to-cloud application 25 executing procedure.

When the display controller 27 of the image forming apparatus 20 displays the application selective screen on a touch panel of the operations panel in the image forming apparatus 20, the scan-to-cloud application 25 is selected as an application subject to execution (step S301).

FIG. 12 is a diagram illustrating an example of the application selective screen 510. In FIG. 12, the application selective screen 510 includes icons corresponding to application programs illustrated in FIG. 4 so as to allow a user to select a desired one of the applications illustrated in FIG. 4.

In the application selective screen 510, the icon 511 corresponding to the scan-to-cloud application 25 is selectively touched so as to specify the scan-to-cloud application 25 as the application subject to execution. Note that the display controller 27 may display, in response to the selection of the icon 511, a setting screen on a touch panel for allowing the user to select an executing condition associated with the scan-to-cloud application 25. The display controller 27 prompts the user to set scanning related setting information (resolution, color or monochrome selection, etc.), and image processing related information (compression format, data format and etc.) for the scanned image data via the setting screen, or the access destination ID information as the transmission destination of the scanned image data (step S302). Note that the user may not be required for directly inputting the value corresponding to the access destination ID information. For example, a list of the cloud-based service names may be displayed and a transmission destination corresponding to a selected one of the cloud-based service names may be specified as access destination ID information. In this case, associated information between the cloud-based service name and the access destination information may be stored in the image forming apparatus 20, or may be acquired from the information processing apparatus 10.

When the user presses a start key (i.e., a start button) on the operations panel after having set the executing condition of the scan-to-cloud application 25, the scan-to-cloud application 25 allows a scanner of the image forming apparatus 20 to execute scanning of image data from a document placed on a platen or placed on an auto document feeder (ADF) of the image forming apparatus 20 (step S303). Subsequently, the communication controller 28 transmits a transmission request for transmitting the scanned data to the information processing apparatus 10 (step S304). The transmission request specifies the scanned image data and the executing condition set in step S302.

In the information processing apparatus 10, the transmission request is received by the device communication controller 111 via the device interface device 106 and the received transmission request is transmitted to the job controller 12. The job controller 112 causes the image processing part 113 to execute processing corresponding to setting information associated with image processing contained in the executing condition specified by the transmission request (step S305).

Subsequently, the job controller 112 inputs the transmission request into the access controller 114. The access controller 114 stores the image data (i.e., data input from the image forming apparatus 20) specified by the transmission request in the auxiliary storage device 102 (step S306). The access controller 114 also stores a data ID of the corresponding data, updated date and time (current date and time), a thumbnail image, a path name of a stored destination (i.e., stored destination path name) of the corresponding data, access destination ID information, and the like in the synchronization data storage (e.g., FIG. 7). The thumbnail image may be generated by the image processing part 113. The access destination ID information is the one contained in the executing condition specified by the transmission request.

Thus, when the access controller 114 receives the transmission request, the access controller 114 will not immediately transmit but will store data associated with the transmission request (i.e., the image data) within the information processing apparatus 10. The data stored in the information processing apparatus 10 are transmitted to a transmission destination associated with the access destination ID information (i.e., the transmission destination specified by the transmission request) when the synchronization controller 119 executes the synchronization processing (see FIG. 5). Specifically, there is a high possibility that the image data subject to transmission may not be stored in the cloud-based service specified as the transmission destination. Accordingly, when step S110 of FIG. 5 associated with the corresponding image data is executed, the corresponding image data are transmitted to the cloud-based service specified as the transmission destination. As a result, the communication via the external network N1 may not be executed for the transmission of the data every time a job is executed. That is, the transmission of the data via the external network N1 may be limited to the timing of performing the synchronization processing.

Subsequently, the access controller 114 returns to the job controller 112 a processing result corresponding to the transmission request input by the job controller 112. In this case, a result of whether the image data are stored is returned to the job controller 112 is transmitted as a result of whether the image data are transmitted. This is because layers higher than the job controller 112 are not associated with the timing of transmitting the image data.

Subsequently, the job controller 112 returns the processing result received from the access controller 114 to the image forming apparatus 20 via the device communication controller 111 (step S307).

Then, the display controller 27 of the image forming apparatus 20 displays, for example, a message or the like indicating the returned processing result on the touch panel (step S308). The user may check whether the image data are transmitted (uploaded) to the cloud-based service based on the message or the like.

Next, a procedure for executing a cloud-to-print application 26 is described. FIG. 13 is a diagram illustrating an example of the cloud-to-print application 26 executing procedure.

When the display controller 27 of the image forming apparatus 20 displays the application selective screen 510 (FIG. 12) on the touch panel of the operations panel in the image forming apparatus 20, the cloud-to-print application 26 is selected (see icon 512) as an application subject to execution (step S401).

Subsequently, the communication controller 28 transmits an acquisition request for acquiring the list-of-data information stored in the cloud-based service to the information processing apparatus 10 (step S402).

In the information processing apparatus 10, the acquisition request is received by the device communication controller 111 via the device interface device 106 and the received acquisition request is transmitted to the job controller 12. The job controller 112 inputs the acquisition request into the access controller 114. The access controller 114 acquires the list-of-data information stored in the cloud-based service from the synchronization data storage 120 (step S403). The access controller 114 returns the list-of-data information to the job controller 112.

Accordingly, when the access controller 114 receives the acquisition request for acquiring the list-of-data information stored in the cloud-based service, the access controller 114 will not acquire the list-of-data information from the cloud-based service but will acquire the list-of-data information from the synchronization data storage 120 of the information processing apparatus 10. The content of the synchronization data storage 120 has been synchronized with the content of the cloud-based service side in the synchronization processing (FIG. 5) performed the synchronization controller in step S108. Hence, the access controller 114 may transparently return the list-of-data information managed in the cloud-based service to the job controller 112 by acquiring the list-of-data information stored in the synchronization data storage 120. As a result, the communication via the external network N1 may not be executed for the acquisition of the bibliographic information of the data every time a job is executed. That is, the acquisition of the bibliographic information via the external network N1 may be limited to the timing of performing the synchronization processing.

Subsequently, the job controller 112 returns the list-of-data information received from the access controller 114 to the image forming apparatus 20 via the device communication controller 111 (step S404).

Then, the display controller 27 of the image forming apparatus 20 displays a data selective screen for allowing the user to select the data subject to printing on the touch panel (step S405). The data selective screen includes thumbnail images corresponding to the data on the list, which are displayed in a selectable manner.

Subsequently, in the data selective screen, when the user selects one of the thumbnail images and inputs printing execution instruction, the communication controller 28 transmits an acquisition request for acquiring the data associated with the selected one of the thumbnail images to the information processing apparatus 10 (step S406). The acquisition request specifies the data ID, the access destination ID information and the like of the corresponding data.

In the information processing apparatus 10, the acquisition request is received by the device communication controller 111 via the device interface device 106 and the received acquisition request is transmitted to the job controller 12. The job controller 112 inputs the acquisition request into the access controller 114. The access controller 114 acquires from the auxiliary storage device 102 data corresponding to the stored destination path name associated with the data ID and the access destination ID information specified by the acquisition request in the synchronization data storage 120 (step S407). The access controller 114 returns the acquired data to the job controller 112.

Hence, when the access controller 114 receives the acquisition request for acquiring the data, the access controller 114 will not acquire the data from the cloud-based service but will acquire the data from the auxiliary storage device 102 of the information processing apparatus 10. The data associated with the acquisition request has been acquired from any one of the cloud-based services in the synchronization processing (FIG. 5) performed by the synchronization controller in step S106. Hence, the access controller 114 may transparently return the data managed in the cloud-based service to the job controller 112 by acquiring the data stored in the auxiliary storage device 102. As a result, the communication via the external network N1 may not be executed for the acquisition of the data every time a job is executed. That is, the acquisition of the data via the external network N1 may be limited to the timing of performing the synchronization processing.

Subsequently, the job controller 112 returns the data received from the access controller 114 to the image forming apparatus 20 via the device communication controller 111 (step S408).

The cloud-to-print application 26 of the image forming apparatus 20 then causes a printer of the image forming apparatus 20 to execute printing of the returned data (step S409). As a result, a printing result of the data existing in the cloud-based service in viewing from the user or the image forming apparatus 20 is output.

Note that when processing such as data transfer, data transmission via mail, data transmission via facsimile, or data accumulation within the image forming apparatus 20 is executed instead of printing of the data, communication between the image forming apparatus 20 and the information processing apparatus 10 may be similar to the communication illustrated in FIG. 13.

Subsequently, procedures in FIGS. 11, 13 and the like executed by the information processing apparatus 10 in response to the requests (i.e., data transmission request, list-of-data information acquisition request, and data acquisition request) from the image forming apparatus 20 are described in a generalized manner.

FIG. 14 is a flowchart illustrating an example of a procedure executed by the information processing apparatus 10 in response to a request from the image forming apparatus 20.

In step S501, the device communication controller 111 receives a request from the image forming apparatus 20 via the device interface device 106. The request may include the data transmission request in step S304 of FIG. 11, the list-of-data information acquisition request in step S402 or the data acquisition request in step S406 of FIG. 13.

Subsequently, the job controller 112 receives the request from the device communication controller 111 (step S502). Subsequently, the job controller 112 determines whether to require image processing based on a content of the request (step S503) For example, when the request contains setting information associated with the image processing in a manner similar to the data transmission request in step S304, the job controller 112 determines that the image processing is necessary.

If the image processing is determined as necessary ("Yes" in step S503), the image processing part 113 executes processing corresponding to setting information of the image processing specified by the request (step S504).

When the image processing is successful ("Yes" in step S505) or when the image processing is determined as unnecessary ("No" in S503), the access controller 114 receives the request from the job controller 112 (step S506). Subsequently, the access controller 114 executes processing by utilizing the synchronization data storage 120 in response to the request (step S507). Specific example of the processing performed in response to the request may be illustrated in step S306 of FIG. 11, in step S406 or S407 of FIG. 13.

In any one of step S306, S403 and S407, the access controller 114 executes pseudo-access to the requested cloud-based service without executing the communication via the external network N1.

Subsequently, the job controller 112 receives a processing result of the processing performed in response to the request from the access controller 114 (step S508). Subsequently, the device communication controller 111 returns the processing result to the image forming apparatus 20 via the device interface device 106 (step S509).

As described above, according to the embodiment, the cloud-based service may be an uploading destination (transmission destination) or a downloading destination (acquisition destination) of the image data scanned by the image forming apparatus 20, or the data to be printed or the like by the image forming apparatus 20. Accordingly, the user may access the image data scanned in the image forming apparatus 20 at home or at a business trip destination. In addition, the data unloaded at home or at the business trip destination may be printed by the image forming apparatus 20.

On the other hand, the image forming apparatus 20 is concealed by the information processing apparatus 10 from the external network N1. That is, the information processing apparatus 10 carries out communication with the cloud-based service for the image forming apparatus 20. The time in which the communication between the information processing apparatus 10 and the cloud-based service is performed may be limited to the predetermined cycle. Accordingly, the time in which the corporate internal network environment E1 is exposed to the external network N1 may be reduced. As a result, a high security level may be provided in the corporate internal network environment E1 in this embodiment compared to the corporate internal network environment capable of communicating with the external network N1 without any conditions. Further, since the communication via the external network N1 is not performed every time a job is executed in this embodiment, a processing time for executing each of the jobs may be reduced.

Hence, according to the embodiment, an appropriate security level may be maintained while utilizing the advantageous "location free" accessibility to data or information via the cloud-based services.

Further, in this embodiment, since the plural cloud-based services (i.e., server apparatuses 60) are synchronized, appropriate security levels may be maintained in the cloud-based services while utilizing the advantageous "location free" accessibility to data or information via the cloud-based services.

Note that in the above embodiment, the image forming apparatus 20 is illustrated as an example of the apparatus that utilize the cloud-based services via the information processing apparatus 10. However, the procedures of the above embodiment may be applied to other apparatuses such as the smartphone 30, the PC 40, and the digital camera 50 that utilize the cloud-based services via the information processing apparatus 10. For example, in a case of the smartphone 30 or the PC 40, the transmission of the data stored in the smartphone 30 or the PC 40 to the cloud-based service may be required of the information processing apparatus 10. Further, the downloading of the data from the cloud-based service to the smartphone 30 or the PC 40 may be required of the information processing apparatus 10. In addition, in a case of the digital camera 50, the transmission of the image data taken by the digital camera 50 may be required of the information processing apparatus 10.

Moreover, the image forming apparatus 20, which is a large-sized apparatus serving as a data generation source or a data output source for uploading the data to the cloud-based service or for downloading the data from the cloud-based service, may be integrated with the information processing apparatus 10. Specifically, the information processing apparatus 10 may be incorporated into an enclosure of the image forming apparatus 20 or the like.

Note that in this embodiment, the server apparatus 60 is an example of the information management apparatus. The auxiliary storage device 102 or the synchronization data storage 120 is an example of a data storage unit. The synchronization controller 119 is an example of a synchronization controller unit. The API selective information storage 118 is an example of an associated information storage unit. The cloud-a access API 115, the cloud-b access API 116 and the standard API 117 are an example of a communication unit. The access controller 114 is an example of an access controller unit.

According to the embodiment, an appropriate security level may be maintained while utilizing the advantageous "location free" accessibility.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

This patent application is based on Japanese Priority Patent Application No. 2011-123439 filed on Jun. 1, 2011, the entire contents of which are hereby incorporated herein by reference.

What is claimed is:

1. An information processing system, comprising:
    an image forming apparatus; and
    an information processing apparatus connected to the image forming apparatus, wherein the information processing apparatus includes:
        data storage circuitry configured to store identifier information of an information management apparatus connected to the information processing apparatus in association with data acquired from the information management apparatus;
        synchronization controller circuitry configured to:
            periodically acquire from the information management apparatus a list of data stored in the information management apparatus;
            compare the acquired list of data with a list of data stored by the data storage circuitry in association with the identifier information of the information management apparatus; and
            acquire, when there are data not included in the list of stored data among the list of the acquired data, the data not included in the list of stored data among the list of the acquired data from the information management apparatus and store the acquired data by the data storage circuitry; and
        first transmitting circuitry configured to transmit the data stored by the data storage circuitry in association with the identifier information of the information management apparatus without acquiring data from the information management apparatus when receiving from the image forming apparatus an acquisition request for acquiring data stored in the information management apparatus,
    wherein the information processing apparatus is configured to prevent the image forming apparatus from having direct communication with the information management apparatus, and wherein the image forming apparatus includes:
        second transmitting circuitry configured to transmit the acquisition request to acquire the data stored in the information management apparatus; and
        data receiving circuitry configured to receive data transmitted from the information processing apparatus in response to the acquisition request transmitted from the second transmitting circuitry.

2. The information processing system according to claim 1, wherein the image forming apparatus further includes:
    reading circuitry configured to read image data of a document,
    wherein the second transmitting circuitry is further configured to transmit the image data read by the reading circuitry and the identifier information of the information management apparatus to the information processing apparatus,
    wherein the data storage circuitry is further configured to store the image data transmitted from the image forming apparatus in association with the identifier information of the information management apparatus, and
    wherein the synchronization controller circuitry is further configured to transmit to the information management apparatus image data stored only in the information processing apparatus among the image data stored in association with the identifier information of the information management apparatus.

3. The information processing system according to claim 1, further comprising:
    communication circuitry configured to execute a communication process based on an access mode for accessing the information management apparatus;
    information storage circuitry associated with the communication circuitry and being configured to store associated information between the information management apparatus and the communication circuitry; and
    access controller circuitry configured to cause the communication circuitry, based on the associated information, to execute processing in response to at least one request from the synchronization controller circuitry,
    wherein one of the at least one requests is associated with transmission of data stored only by the data storage circuitry to the information management apparatus, and another of the at least one requests is associated with acquisition of data stored only in the information management apparatus from the information management apparatus.

4. An information processing apparatus connected to an image forming apparatus, the information processing apparatus comprising:
    data storage circuitry configured to store identifier information of an information management apparatus connected to the information processing apparatus in association with data acquired from the information management apparatus;

synchronization controller circuitry configured to:
- periodically acquire from the information management apparatus a list of data stored in the information management apparatus;
- compare the acquired list of data with a list of data stored by the data storage circuitry in association with the identifier information of the information management apparatus; and
- acquire, when there are data not included in the list of stored data among the list of the acquired data, the data not included in the list of stored data among the list of the acquired data from the information management apparatus and store the acquired data by the data storage circuitry; and first transmitting circuitry configured to transmit the data stored by the data storage circuitry in association with the identifier information of the information management apparatus without acquiring data from the information management apparatus when receiving from the image forming apparatus an acquisition request for acquiring data stored in the information management apparatus, wherein the information processing apparatus is configured to prevent the image forming apparatus from having direct communication with the information management apparatus.

5. A method of using an information processing system comprising an image forming apparatus and an information processing apparatus connected to the image forming apparatus, the method comprising:

in the information processing apparatus:
- storing, using data storage circuitry, identifier information of an information management apparatus connected to the information processing apparatus in association with data acquired from the information management apparatus,
- periodically acquiring from the information management apparatus, using synchronization controller circuitry, a list of data stored in the information management apparatus,
- comparing, using the synchronization controller circuitry, the acquired list of data with a list of data stored by the data storage circuitry in association with the identifier information of the information management apparatus, and
- acquiring, using the synchronization controller circuitry, when there are data not included in the list of stored data among the list of the acquired data, the data not included in the list of stored data among the list of the acquired data from the information management apparatus and store the acquired data by the data storage circuitry,
- transmitting, using first transmitting circuitry, the data stored by the data storage circuitry in association with the identifier information of the information management apparatus without acquiring data from the information management apparatus when receiving from the image forming apparatus an acquisition request for acquiring data stored in the information management apparatus;
- preventing the image forming apparatus from having direct communication with the information management apparatus; and in the image forming apparatus:
- transmitting, using second transmitting circuitry, the acquisition request to acquire the data stored in the information management apparatus, and
- receiving, using data receiving circuitry, data transmitted from the information processing apparatus in response to the acquisition request transmitted from the second transmitting circuitry.

6. The information processing apparatus according to claim 4, wherein the information processing apparatus is configured to be communicable with at least one additional apparatus and to prevent said at least one additional apparatus from having direct communication with the information management apparatus.

* * * * *